United States Patent [19]
Walters

[11] Patent Number: 4,960,302
[45] Date of Patent: Oct. 2, 1990

[54] SHOPPING CART BONNET

[76] Inventor: Peter C. Walters, P.O. Box 2586, Hamilton Square, N.J. 08690

[21] Appl. No.: 428,985

[22] Filed: Oct. 30, 1989

[51] Int. Cl.⁵ .............................................. B60P 7/02
[52] U.S. Cl. .................................. 296/100; 296/78.1; 296/136; 150/166
[58] Field of Search ...................... 296/100, 78.1, 136; 150/166, 154

[56] References Cited

U.S. PATENT DOCUMENTS

| | | | |
|---|---|---|---|
| 2,789,863 | 4/1957 | Shimabukuro | 296/77.1 |
| 2,917,094 | 12/1959 | Sullivan | 150/166 |
| 3,227,484 | 1/1966 | Merclean | 296/77.1 |
| 4,221,429 | 1/1980 | Wade | 297/277 |
| 4,244,411 | 1/1981 | Karlström | 150/154 |

Primary Examiner—Robert R. Song
Attorney, Agent, or Firm—William L. Muckelroy

[57] ABSTRACT

A cover is disclosed for preventing impingement of solar radiation, rain, sleet, snow, and dust upon the contents of a shopping cart and which in addition provides glow-in-the-dark advertising indicia disposed on the cover. The cover comprises a trapeloidal sheet member having a first top edge and a second top edge interconnected by a third top edge. The top member has connected to it first and second rectangular sheet members connected to the first and second top edges respectively, the first and second sheet members being interconnected by a third rectangular sheet member attached to the third edge of the trapeloidal sheet member. The first and second sheet members are disposed on opposite sides of the shopping cart and have attached thereto strips of a material such as Velcro or a string or a rope material, for example, which are connected so as to secure the cover to the shopping cart.

3 Claims, 2 Drawing Sheets

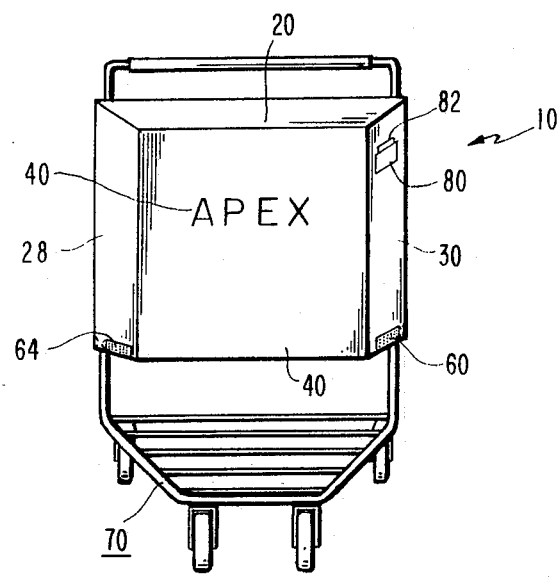
FIG. 3
FIG. 4
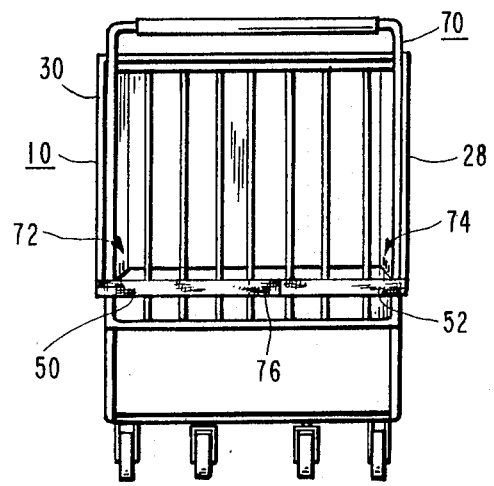

SHOPPING CART BONNET

BACKGROUND OF THE INVENTION

1. Field of the Invention

This invention relates to cover devices for covering shopping carts of the type routinely used in grocery stores to transport purchased items from inside the store to the parking lot outside the store. A novel cover according to the invention may be readily slipped onto the shopping cart and will snugly accommodate itself to the shopping cart in a manner to protect the contents against being exposed to sun, rain, snow, sleet, and dust as is often the case when it is necessary to transport the contents of the cart after shopping during a rainstorm or duststorm from inside a grocery store into a motor vehicle.

2. Description of the Prior Art

Various types of covers for shielding from the elements are available in the prior art. For example, umbrellas, are the most notable and the most widely used. J. C. Penney's mail order catalog for 1988 offered a vinyl liner for personal laundry type carts. This liner was adapted with a top to fit over the top edge of the cart.

It is the primary object of the invention to provide a cover for preventing impingement of snow, rain, sleet or other undesirable percipitation, as well as dust upon the contents of a standard grocery store shopping cart. Another object of the invention is to provide a cover to prevent the soiling of foods in shopping bags with dust and other debris which may be blown onto the contents of the shopping bag by wind.

Another object of the invention is to provide a shopping cart bonnet on which various advertising of the store providing the cart and bonnet may be imprinted.

Among the features of the novel invention appealing to the marketplace are its convenience, durability, compactness, inexpensiveness, lightweightness and ease of use.

The invention is particularly helpful during rain or snowstorms when transporting groceries from a store to a cart in a parking lot. Purchased groceries do not become wet in transit. If packaged in paper sacks, the sacks do not become soggy and torn. The novel invention is marketable directly to consumers and may be provided as a service by grocery store proprietors.

The novel invention may be mass-produced using conventional and readily available materials and manufacturing processes. The novel bonnet may be produced in a manner similar to types of covers used as basketliners or as protectors for outdoor furniture. Comparable production procedures may be used. Material for the bonnet include flexible polyvinylchlorides, plastics, elastic and strips of Velcro fasteners, for example. Finishing of the item includes placement of elastic, plastic string, or Velcro by machine stitching, for example.

The foregoing outlines some of the more pertinent objects of the present invention. These objects should be construed to be merely illustrative of some of the more pertinent features and applications of the invention. Many other beneficial results can be obtained by applying the disclosed invention in a different manner or modifying the invention within the scope of the disclosure. Accordingly, other objects and a further understanding of the invention may be obtained by referring to the summary of the invention and the detailed description describing the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing the invention relates to a cover for preventing the impingement of rain or other precipitation or dust upon the contents of a portable shopping cart. The cover comprises a trapezoidal top member, for example, connected to two rectangular side members. The two rectangular side members are interconnected by a third front rectangular panel which is also connected to the top member. An attaching means interconnects the two rectangular side members at their lower edges and attaches the cover snugly about the cart at the rear of the cart. The attaching means may be either a pair of Velcro strips connected together, a pair of rope members tied together, or a pair of elongated strips of cloth or elastic tied together or otherwise joined such as with snaps or other equivalent means.

In another embodiment of the invention the cover includes advertising indicia disposed on the various rectangular panels for advertising a product or company. Preferably, the cover is composed of plastic and is brightly colored or panted with glow-in-the-dark paint so as to provide a noticeable object to other motorists operating in the parking lot of a shopping center.

The foregoing is a rather broad outline. The more pertinent and important features of the present invention follow. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purpose of the present invention, for example, the attachment of an elasticized strip along the bottom edge of the bonnet so as to provide a more snug fit of the bonnet about a particular shopping cart. It should also be realized by those skilled in the art that such equivalent construction do not depart from the spirit and scope of the invention as set forth in the appended claims.

BRIEF DESCRIPTION OF THE DRAWINGS

For a full understanding of the nature and object of the invention, reference should be had to the following detailed description in connection with the accompanying drawings in which:

FIG. 3 is another front view of the cover of FIG. 1 disposed on a shopping cart; and FIG. 4 is a rear view of the cover in FIG. 3 shown attached to a shopping cart.

DESCRIPTION OF THE PREFERRED EMBODIMENT

Figure 1:
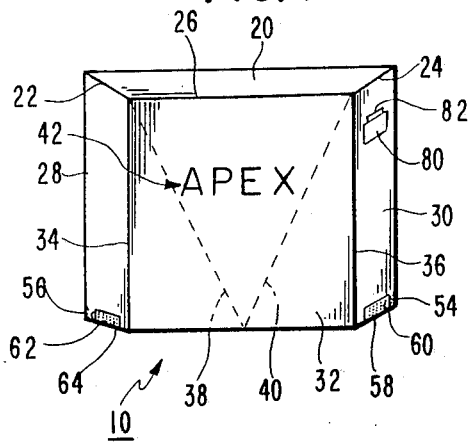
FIG. 1 is a front view of a cover for a shopping cart.

FIG. 1 is a front view of a cover 10 for preventing impingement of solar radiation, precipitation, and dust upon the contents of a common portable grocery store shopping cart (not shown). The cover 10 comprises a top trapezoidal sheet member 20 having first and second edges 22 and 24 interconnected by a third edge 26. The top member 20 has a first side member 28 connected to it at the first edge 22 and a second side member 30 connected to it at the edge 24. The first side member 28 and the second side member 30 are interconnected via a front rectangular panel member 32. The rectangular panel member 32 is connected to the top member 20 via the edge 26. The areas which comprise the members 20, 28 and 30 may be used for printing advertising, for example, advertising indicia disposed on the various rectangular panels for advertising a product or company and painted with glow-in-the-dark paint so as to provide a noticeable object.

The cover 10 is preferably made of a single sheet of plastic, for example, wherein the edges 34 and 36 which interconnect the first member 28 and the second panel 30 respectively to the front panel 32 are stitched such that the cover 10 is formed from a single rectangular piece. Preferably, the cover 10 is a bonnet formed of a flexible sheet material and brightly colored. Shown in FIG. 1 are the edges 38 and 40 of the folded sheet material which are concealed inside the cover 10.

Shown in FIG. 1 in the front view of cover 10 are marking indicia 42 on the front member 32. Preferably, the marking indicia 42 is in the form of an advertisement, a safety marker, or the like. Accordingly, the cover 10 has a useful purpose as an advertisement, a safety marker, bonnet for the human torso, or the like independent of preventing the impingement of solar radiation, precipitation, and/or dust upon the contents of the shopping cart.

Figure 2:
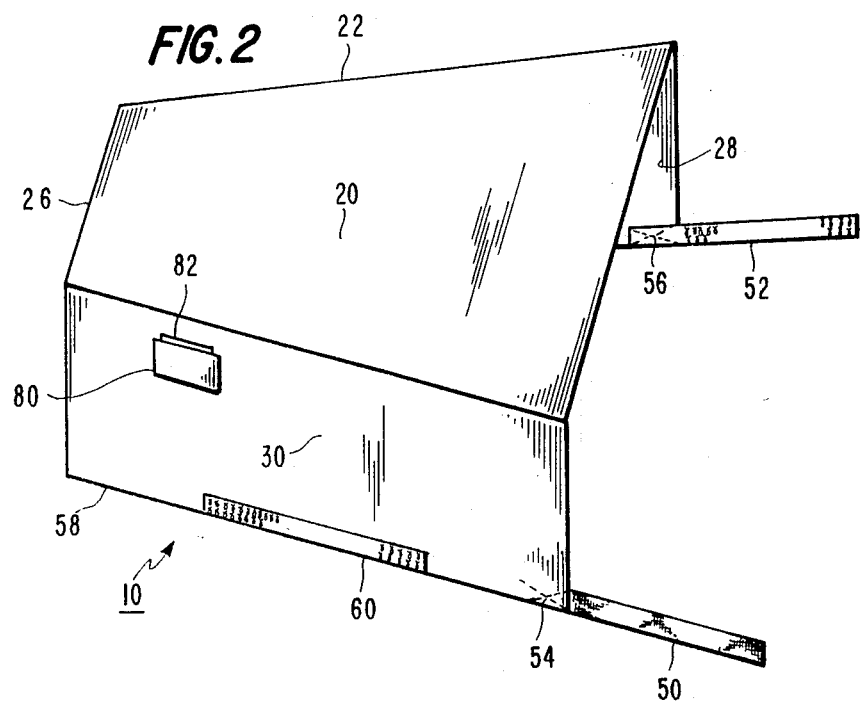
FIG. 2 is a perspective view of the cover of FIG. 1.

FIG. 2 is a perspective view of the cover 10 for preventing the impingement of solar radiation, precipitation and/or dust upon the contents of the shopping cart (not shown). The cover 10 comprises attaching means for attaching the cover 10 to a shopping cart (not shown), for example, elongated velcro strips 50 and 52. The strip 50 is adapted to interconnect and attach to the strip 52. The strip 50 is connected to the member 30 by means of stitching 54, for example. The Velcro strip 50 is placed on the inside of the member 30. The Velcro strip 52 is placed on the inside of the member 28 and stitched thereto by means of stitches 56. The member 30 has a bottom edge 58. This bottom edge has an elastic member 60 attached to it by glue, sewing or other means. The elastic member 60 is stretched prior to attachment to the panel 30. Referring now to FIG. 1 there is also a similar elastic member 62 attached to the member 28 at its bottom edge 64. These two elastic members 60 and 62 serve to adapt the cover 10 to the bottom shape of a shopping cart by causing the bottom edges 58 and 64 to draw snugly about the shopping cart (not shown).

In the various figures of the drawings like numerals refer to like parts of the cover 10 shown. FIG. 3 is another front view of the cover 10 adapted as a bonnet to cover a shopping cart 70. The attached elastic strips 60 and 64 facilitate the cover 10 fitting snugly about and over the shopping cart 70. As the elastic members 60 and 64 as shown in FIG. 3 retract, they form the ridges 72 and 74 depicted in FIG. 4.

Shown in FIG. 4 is a rear view of the cover 10 adapted to fit over and around the cart 70. Shown there are the strips 50 and 52 connected by means of their Velcro construction so as to draw the sides 30 and 28 snugly to the sides of the cart 70. Area 76 is the necessary area of Velcro overlap of the strips 50 and 52.

In FIGS. 1, 2 and 3 there is shown a pocket 80 containing a coupon 82 or plurality of the coupon 82. Preferably the pocket 80 is made of clear plastic and attached to the side member 30 by conventional means such as for example glueing or stitching. Alternatively, the coupon 82 may be attached to the side member 30 in a frangible or removable fashion. The coupon 82 is preferably a redeemable coupon enabling the user of the cover 10 to obtain credit on the purchase of an item or product for sale by the company furnishing the cover 10.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In an article of manufacture comprising a bonnet means for covering a shopping cart wherein said bonnet means is further adapted for use as a protective means for shielding an upper portion of the cart from solar radiation, dust and water, said article further comprising a trapezoidal panel generally corresponding to the open top of the shopping cart having a first edge and a second edge innerconnected by a third edge, a first rectangular panel attached at said first edge, a second rectangular panel attached at said second edge, a third rectangular panel innerconnecting said first and second panels and attached at said third edge for covering the top, front and sides of the shopping cart said article further comprising attaching means for attaching said article to said shopping cart, said attaching means comprising a pair of strips attached to said first and second rectangular panels, said strips being adapted for tying said strips together, comprising advertising indicia made of glow-in-the-dark paint and disposed on at least one of said panels for advertising.

2. The article according to claim 1, further comprising a pocket attached to at least one of said panels, said pocket containing a coupon, said pocket being transparent whereby aid coupon may be viewed.

3. The article according to claim 1, further comprising a coupon attached to one of said panels and removable therefrom.

* * * * *